Nov. 17, 1953  G. L. HELLER  2,659,663
PROCESS FOR PRODUCING CARBON BLACK
Filed Nov. 14, 1950
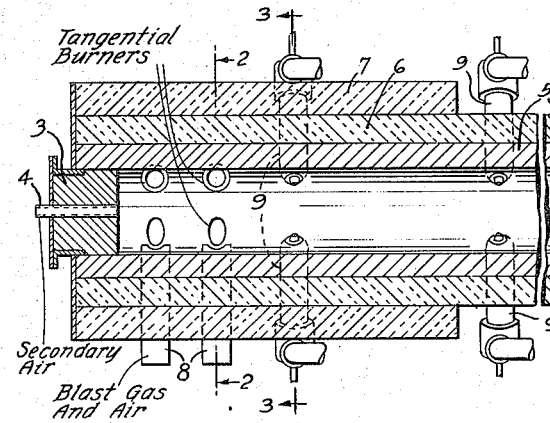
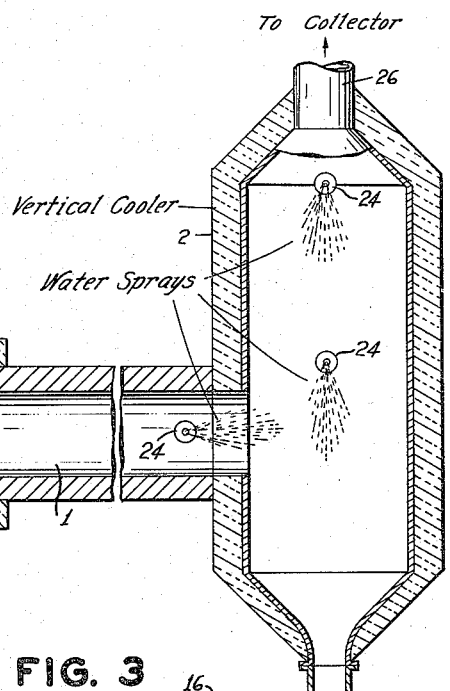
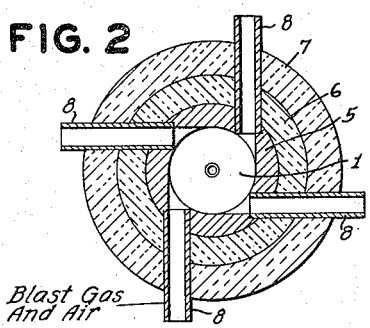
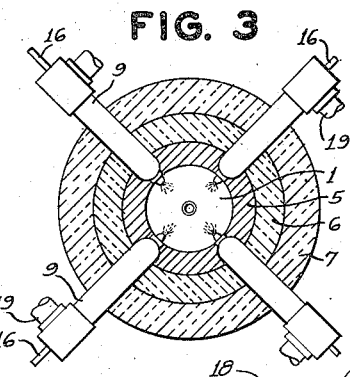
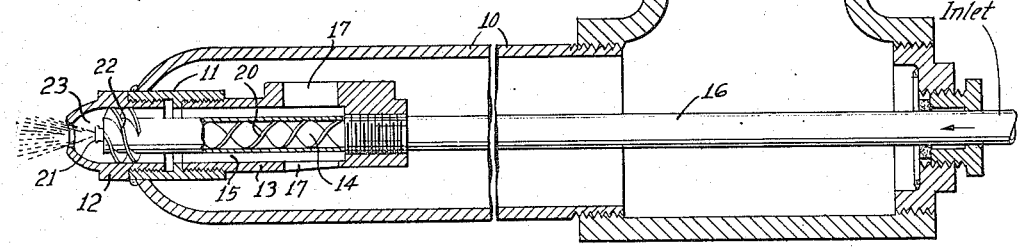
INVENTOR
George L. Heller
BY
Pennie, Edmonds, Morton & Barrows
ATTORNEYS Patented Nov. 17, 1953

2,659,663

UNITED STATES PATENT OFFICE 2,659,663

PROCESS FOR PRODUCING CARBON BLACK

George L. Heller, Monroe, La., assignor to Columbian Carbon Company, New York, N. Y., a corporation of Delaware Application November 14, 1950, Serial No. 195,530

1 Claim. (Cl. 23—209.4)

The present invention relates to the manufacture of carbon black and particularly to the process involving the thermal decomposition of a hydrocarbon by rapidly and uniformly mixing it with a hot gaseous medium at a temperature well in excess of that at which the hydrocarbon is decomposed to carbon black.

In the Wiegand and Braendle Patent No. 2,378,055 there is described an improved process of the type just noted in which a combustible mixture of a fluid hydrocarbon fuel and air is blasted into one end of an elongated, unobstructed chamber to form a turbulent stream of hot blast flame gases. This turbulent stream of blast flame gases flows through the chamber and, at a zone removed from the zone of generation of the blast flame gases, the hydrocarbon to be decomposed is separately and forcefully injected into the turbulent stream of hot gases.

The present invention provides a desirable modification of the type of process described in the patent and permits the use of a heavy, normally liquid, relatively inexpensive hydrocarbon as the hydrocarbon to be decomposed with greater advantage than heretofore.

In operations such as specifically illustrated in the patent, the hydrocarbon to be decomposed, herein designated "make," is radially injected into the furnace chamber as relatively small high velocity streams, advantageously positioned directly opposite one another. The make has normally been a gaseous hydrocarbon, natural gas, for instance, or a normally gaseous hydrocarbon enriched by mixing therewith vapors of a higher molecular weight, normally liquid hydrocarbon.

With the growing demand and increasing distribution facilities for natural gas for other purposes, it has become highly desirable to adapt carbon black processes to the use of other raw materials as the make. Within the petroleum industry there are available certain high boiling petroleum fractions and residuum unfit for further processing and which cannot be distilled, or further treated, economically. Unfortunately, the tendency of such higher boiling fractions and residuum hydrocarbons to decompose upon heating is much more pronounced than that of the normally gaseous, or lower molecular weight liquid hydrocarbons. These complex hydrocarbons and "tars" decompose at temperatures usually well below their boiling points and any attempt to vaporize them prior to injection into the reaction zone of a carbon black process, as make, results in a rapid coking of the vaporizing chamber or conduits leading therefrom to the furnace chamber and high loss in raw materials. This difficulty has been a deterrent to such operations.

A logical solution to such problem was, of course, to spray the liquid hydrocarbons directly into the reaction chamber and this has been proposed in certain types of operation. However, it has necessitated the use of very high pressures to atomize the oil into the chamber and relatively cool furnace atmosphere at the point of entry of the make to permit at least partial vaporization before admixture with separately introduced air for combustion. Atomization of the oil, even at extremely high pressure, produces oil droplets in excess of 200 millimicrons in diameter and usually has resulted in the production of a relatively coarse type of carbon pigment. Efforts to meet the requirements have led to the axial introduction of the high pressure oil spray with circumferential or tangential injection of air for combustion. Thus, the spray nozzle is protected from high furnace temperatures and the swirling air along the outer walls, to some extent, offsets and helps to prevent coke accumulation on the furnace walls due to impingement thereon by the high pressure spray.

A difficulty heretofore experienced where it has been attempted to produce carbon black from liquid hydrocarbons has been due to the fact that where concentrated hydrocarbons, either liquid, vapor, or gas, are permitted to come in contact with hot solid surfaces such as brickwork or furnace lining, an undesirable type of carbon is formed, apparently due to some catalytic action of the solid surface. The use of an elongated, unobstructed reaction chamber more readily permits the injection of an oil spray into the chamber with little or no contact between concentrated hydrocarbons and the furnace chamber by axial injection of the oil spray. However, that type of operation is deficient with respect to extremely rapid mixing of the make with the hot furnace gases.

An essential and desirable feature of the process to which the present invention relates is the extremely rapid mixing of the make with the hot blast flame gases. This more rapid mixing is best attained by injecting the make radially into the furnace chamber. Heretofore it has not been practical to spray liquid hydrocarbons radially into the reaction chamber in operations of this type, due to excessive coking of the spray-head and tubes leading thereto.

In my copending application, Serial No. 195,529, filed concurrently herewith, I have described and claimed a method of protecting the atomizing nozzles, or spray-heads, from coking in a process of the type wherein the make is passed through, and in heat exchange relation with, the hot side walls of the chamber. As there described, the nozzle is protected by circulating a cooling medium in heat exchange relation with the make stream so as to maintain the temperature of the make at below that at which substantial carbon-forming decomposition of the make is effected up to the point of injection into the chamber.

My present invention is a further modification of the type process to which the application relates whereby improved atomization of oil is obtained.

In accordance with my present invention, the make, or a substantial part thereof, is composed of normally liquid hydrocarbons and this liquid make is injected, as such, radially, or substantially so, into the hot blast flame gases passing through the reaction chamber. The reaction chamber is, with advantage, of cylindrical cross-section with tangentially positioned blast burners so as to result in a swirling stream of blast flame gases. A related process in which the hydrocarbon make is injected into a swirling stream of furnace gases as disclosed and claimed in my copending application Serial No. 64,764, filed December 11, 1948.

The invention is especially useful, as applied to operations employing cylindrical reaction chambers equipped with tangential blast burners, the make being injected at a zone downstream from the blast burners. In such operations it appears that the blast flame gases tend to follow a more or less helical path through the chamber and, therefore, a path of much greater length so that, for a given time within a reaction chamber of a given length, much higher blast flame gas velocities may be maintained than would be possible if the blast flame gases were passed generally axially through the chamber. Also, in operations of this sort, coordination of the velocities of the blast flame gases and the entering make is much less critical.

Advantageously, in accordance with my present process, the liquid make may be maintained at a temperature below that at which the particular make would decompose to form substantial amounts of carbon, or coke, until after it has been injected into the furnace chamber, as provided by the invention of my above-noted application.

Reaction chambers used in the manufacture of furnace carbons, by operations of the type to which my present invention relates, necessarily have relatively thick side walls and, during operation, the side walls become very highly heated. By my present process, I utilize the heat contained in the hot side walls of the reaction chamber to preheat a gaseous medium which I subsequently use as a medium for atomizing the hydrocarbon make. I have found that more desirable results are obtained where a preheated gas is used for that purpose. Further, as more fully appears from the following more detailed description thereof, I utilize the atomizing gas as a shield surrounding the make hydrocarbon injection tube at the point where the latter passes through the wall of the reaction chamber, thus protecting the make stream from excessive temperatures of the chamber side walls.

The invention will be more fully described and illustrated by reference to the accompanying drawings which show conventionally and somewhat diagrammatically, apparatus found particularly useful in carrying out the process and of which Figure 1 is a longitudinal sectional view in elevation of a reaction chamber, together with accessories, including adjacent cooling equipment;

Fig. 2 is a transverse sectional view of the reaction chamber along the lines 2—2 of Fig. 1;

Fig. 3 is a transverse sectional view of the reaction chamber along the lines 3—3 of Fig. 1, showing the liquid make injection nozzles; and Fig. 4 is a somewhat enlarged longitudinal sectional view of said nozzles.

In the apparatus shown, the numeral 1 indicates a cylindrical reaction and cooling chamber, opening at one end into the vertical cooler 2. At the left-hand end the reaction chamber is closed by the block 3 through which conduit 4 extends axially, the conduit being adapted to the introduction of secondary air into the reaction chamber, as required.

The chamber 1 is formed by the cylindrical side walls 5 of highly refractory material which, in turn, is covered by layers 6 and 7 of heat insulating material. Extending through the layers of heat insulating material and the furnace side wall, substantially normal to the longitudinal axis of the chamber, are four blast burner ports 8, each entering the furnace chamber in a circumferential, or tangential, direction, as more clearly shown in Fig. 2 of the drawings. The apparatus shown is provided with two substantially identical sets of these blast burner ports positioned at different distances from the end of block 3. In operation, only one or both sets of ports may be used, as desired.

Further downstream, the furnace chamber is provided with a set of four radially extending make injection nozzles 9, spaced 90° apart and extending through the layers of insulating material and the furnace side wall, as more clearly shown in Fig. 3 of the drawings. These nozzles are provided for the injection into the furnace chamber of liquid hydrocarbon to be decomposed and are normally positioned with their inner ends substantially flush with the inner wall of the furnace chamber. Still further downstream, the furnace is provided with a second set of liquid make injection nozzles 9 substantially identical with those just described.

As shown more clearly in Fig. 4 of the drawings, these liquid make injection nozzles are composed of an outer casing 10, which extends through the furnace wall in contact with the hot furnace refractories. At the left-hand end, the nozzle is equipped with an internally threaded collar 11 secured to the casing, as by welding. At its inner end, the nozzle is equipped with a nozzle tip 12 threaded into the collar 11. Threaded into the other end of the collar is a member 13 composed of an inner passageway 14 and an outer annular passageway 15. The outer end of the inner passageway 14 is connected by tube 16 to a source of hydrocarbon to be used as the make.

The annular passageway 15 is in open communication through ports 17 with the forward end of the annular space within the casing 10, surrounding the tube 16 and the element 13. The opposite end of this annular space is provided with a threaded outlet 18 adapted to be connected, as by tube 19, with any suitable source of tage, be carried on continuously over extended periods without coking of the atomizing nozzles, or periodic interruption of the operation to clean the nozzles.

The invention is independent of the precise construction and arrangement of the liquid make injection nozzles so long as the nozzle used is adapted to effect the atomizing of the liquid by impact with an atomizing gas and to cause the atomizing gas to be strongly preheated in passing through that portion of the atomizing nozzle extending through the side walls of the reaction chamber.

I claim:

In the process of producing carbon black by which a combustible mixture of a fluid hydrocarbon fuel and an oxygen-containing gas is blasted into one end of an elongated cylindrical reaction chamber delineated by thick refractory side walls in a direction substantially tangential to the chamber and burned therein to form a turbulent swirling stream of blast flame gases passing longitudinally through the chamber at a temperature in excess of that at which hydrocarbons are decomposed to form carbon black and a hydrocarbon to be decomposed is separately injected into the swirling gases at a point removed from the point of entry of said gases to the chamber and in a substantially radial direction, the steps of passing a normally liquid hydrocarbon as a confined substantially liquid stream through the hot side walls of the chamber at a point downstream from the zone of combustion, passing an atomizing gas in heat exchange relation with the chamber side walls and in thermal shielding relationship with the stream of hydrocarbon, whereby the atomizing gas is strongly preheated, atomizing the liquid hydrocarbon by violent impact with the preheated atomizing gas and injecting the atomized hydrocarbon into the turbulent gas stream flowing through the reaction chamber.

GEORGE L. HELLER.

References Cited in the file of this patent

UNITED STATES PATENTS

| Number | Name | Date |
|---|---|---|
| Re. 22,886 | Ayers | June 3, 1947 |
| 363,086 | Schoen | May 17, 1887 |
| 744,220 | Neu | Nov. 17, 1903 |
| 903,736 | Lee | Nov. 10, 1908 |
| 1,036,758 | Walters et al. | Aug. 27, 1912 |
| 1,438,032 | Frost | Dec. 5, 1922 |
| 1,807,321 | Miller | May 26, 1931 |
| 2,375,795 | Krejci | May 15, 1945 |
| 2,440,424 | Wiegand et al. | Apr. 27, 1948 |
| 2,553,199 | Loving | May 15, 1951 | air, or other atomizing gas under pressure, steam, for instance.

In operation, liquid hydrocarbon make under moderate pressure, is passed through tube 16 into the inner chamber 14. An atomizing gas, under pressure, air, for instance, is supplied through tube 19 to the outer end of the annular space within casing 10 and, from thence, passes into and through the annular passageway 15. Positioned within the tube 14 is a spiralled baffle 20 so constructed and arranged as to cause the oil to whirl in a counterclockwise direction as it passes through the passageway 14 to the orifice 21.

The atomizing air emerging from the annular space 15 is caused to whirl in a clockwise direction by the spiralled baffles 22. The stream of air and the stream of oil whirling in opposite directions are caused violently to impinge on one another within the chamber 23 of the nozzle tip.

In passing through the annular space within casing 10 of the atomizing nozzle, the air becomes strongly heated by heat absorbed from the furnace walls in contact with the casing 10. When this highly heated air is caused violently to impinge upon the whirling stream of liquid hydrocarbon, the latter is thereby highly atomized and the atomized stream is injected into the violently turbulent stream of hot blast flame gases passing through the reaction chamber.

Advantageously, the liquid make injection nozzles are so spaced about the periphery of the reaction chamber that each injection nozzle is diametrically opposite a second nozzle, the number of nozzles used in each set depending upon the diameter of the reaction chamber and the size of the nozzles.

The invention is particularly applicable to operations in which heavy, high molecular weight hydrocarbons, such as result from the cracking of petroleum are used as the make. A particularly advantageous make is one comprising around 20 to 95%, usually in the range of 60 to 95%, by weight, of aromatic constituents, as determined by the test method D–875–46T of the American Society for Testing Materials. The liquid make should most suitably be one having an aniline cloud-point, as determined by the method prescribed by the said society and designated D–611–46T, within the range of 10° to 125° F. Its end point advantageously should exceed 725° F.

The liquid make may be heavy residuum oils or tars, such as fuel oils No. 5, No. 6 or Bunker C, but an especially useful product is one known as "pressure tar" or "flash drum tar" characterized by high aromaticity, low pour point and high specific gravity. Preferred tars of this type are those having A. P. I. values from +10 to —6, SSU fural viscosities at 122° F., of from 125 to 250, and which are soluble in pentachlorphenol and have specific gravities of from 0.95 to 1.1. These products are readily available from most refineries using thermal cracking methods. The products are essentially asphaltic residuums. In use these heavy tars are preheated to about 250° F. or as required to reduce the viscosity for atomization, but not to exceed 500° F. Another efficacious procedure is to dilute the asphaltic products with an aromatic cycle stock to secure the desired pour point.

These high molecular weight hydrocarbons are rapidly cracked at temperatures well below those at which natural gas is actively decomposed. Because of its less refractory nature, it is important that such liquid make be more rapidly mixed uniformly with the blast flame gases. It has been proposed by another that the blast flame gases be made to assume a swirling motion through the chamber, as previously noted, so as to expedite the mixing. The present invention constitutes an improvement in that type of operation in that it permits the use of a heavy, readily decomposed hydrocarbon fraction as the make, while avoiding difficulties heretofore encountered.

Not only is the heavy oil more thoroughly atomized by reason of the preheating of the atomizing gas, but also the heavy hydrocarbon within the nozzle casing passing through the hot furnace wall is thermally shielded by the incoming atomizing gas so that the hydrocarbon does not become heated to a temperature of active decomposition until it has been injected into the furnace gases.

In operation of the apparatus shown in accordance with my present invention, a combustible mixture of a fluid hydrocarbon fuel and air is blasted at high velocity through the circumferential blast burner ports 8, is ignited and burned within the chamber to form a hot, highly turbulent mass of blast flame gases rapidly swirling through the chamber in a more or less helical path. The hydrocarbon to be decomposed is atomized and injected into the turbulent stream of blast gases passing through the chamber, as previously described.

As the suspension flows through the downstream end of the chamber and through the vertical cooler, it is cooled by contact with the water sprays 24. Any unvaporized water from these sprays, together with any carbon knocked out of suspension, passes downwardly through the vertical cooler into the sump 25 and cooled suspension passes from the upper end of the vertical cooler through the conduit 26 to conventional separating and collecting apparatus, as well understood by the art.

Instead of air, other gaseous materials may be used as the atomizing medium, for instance, natural gas, carbon dioxide, or a gas which is inert under operating conditions.

The volume of atomizing gas used is subject to considerable variation depending upon other operating conditions, for instance, the permissible temperature of the atomizing nozzle, for the particular oil used, to avoid coking, the supply rate, and the viscosity of the oil, furnace temperature and the temperature of the atomizing gas. It is usually desirable that the atomizing gas be supplied under pressure of 50 to 100 pounds per square inch, or more, the optimum pressure being largely dependent upon the viscosity of the oil.

The hydrocarbon mixture should be passed to the atomizing nozzle under considerable pressure, the optimum pressure likewise dependent upon the viscosity of the oil. However, exceedingly high pressures, such as previously proposed for atomizing heavy hydrocarbons, are unnecessary for successful operation. In accordance with my invention, usually oil pressures of 50 to 100 pounds per square inch will be found satisfactory, though higher pressures may be used, where desired.

The invention is particularly useful in localities where water suitable for cooling the atomizing nozzles is at a premium and where furnace temperatures are not excessive. Under such conditions, the operation may, with marked advan-